United States Patent

Itoh et al.

Patent Number: 5,219,689
Date of Patent: Jun. 15, 1993

[54] ELECTROPHOTOGRAPHIC PHOTORECEPTOR COMPRISING AZO COMPOUND

[75] Inventors: Akira Itoh; Hideki Nagamura, both of Tsukuba, Japan

[73] Assignee: Mitsubishi Paper Mills Limited, Tokyo, Japan

[21] Appl. No.: 741,952

[22] Filed: Aug. 8, 1991

[30] Foreign Application Priority Data

Aug. 13, 1990 [JP] Japan ................... 2-214581
Aug. 13, 1990 [JP] Japan ................... 2-214582

[51] Int. Cl.$^5$ .............................................. G03G 5/06
[52] U.S. Cl. ........................................ 430/58; 430/76; 430/78
[58] Field of Search ................. 430/59, 75, 73, 74, 430/78, 77, 58

[56] References Cited

U.S. PATENT DOCUMENTS

4,389,475  6/1983  Hoffmann et al. ............... 430/58
4,413,045  11/1983  Ishikawa et al. ................ 430/59
4,471,040  9/1984  Katagiri et al. ................. 430/59

FOREIGN PATENT DOCUMENTS

3804421  8/1988  Fed. Rep. of Germany.
1230057  9/1989  Japan.
1257960  10/1989  Japan.

Primary Examiner—Marion E. McCamish
Assistant Examiner—Rosemary Ashton
Attorney, Agent, or Firm—Cushman, Darby & Cushman

[57] ABSTRACT

The invention provides an electrophotographic photoreceptor of high sensitivity and high endurance which comprises a conductive support and a light-sensitive layer which contains at least one bis-azo compound selected from the group consisting of those represented by the following formulas (I)-(II):

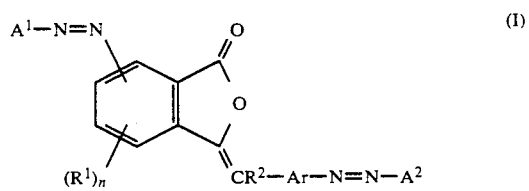

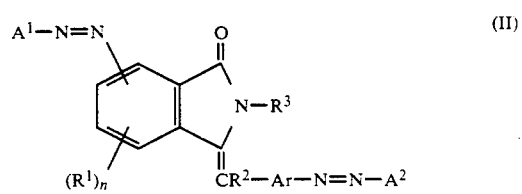

wherein n represents 0, 1, or 3; $R^1$ represents a halogen atom, a hydroxyl group, or an alkyl, aralkyl, aryl, hyterocyclic or alkoxy group which may have a substituent and when n is 2 or 3, $R^1$ may be identical or different; $R^2$ represents a hydrogen atom, a halogen atom, a cyano group, or an ester, alkyl, aralkyl or aryl group which may have a substituent; $R^3$ represents an alkyl, aralkyl, aryl or heterocyclic group which may have a substituent; Ar represents an arylene which may have a substituent; and $A^1$ and $A^2$ each represents an aryl or heterocyclic group which has a hydroxyl group and may be identical or different.

4 Claims, No Drawings

ELECTROPHOTOGRAPHIC PHOTORECEPTOR COMPRISING AZO COMPOUND

BACKGROUND OF THE INVENTION

The present invention relates to an electrophotographic photoreceptor which contains a novel bis-azo compound.

Hitherto, for electrophotographic photoreceptors, inorganic photoconductive materials such as selenium, cadmium sulfide, zinc oxide, and silicon have been known, widely studied and put to practical use. These inorganic materials have many merits, but at the same time, have also various defects. For example, selenium has the difficulty in production conditions and is readily crystallized by heat or mechanical shock. Cadmium sulfide and zinc oxide have difficulties in moisture resistance and endurance. Insufficient chargeability and difficulty in production have been pointed out for silicon. Furthermore, selenium and cadmium sulfide have the problems of toxicity.

On the other hand, organic photoconductive materials have advantages in superior film-forming properties and flexibility, lighter weight, higher transparency and easier design of photoreceptors using proper sensitizing methods.

Fundamental properties generally required for electrophotographic photoreceptors include (1) high chargeability when exposed to corona discharge in the darkness, (2) less leakage, in the dark, of the charge obtained (dark decay), (3) rapid release of the charge when exposed to light (light decay), and (4) little residual charge after exposure to light.

Many studies have been made on photoconductive polymers such as polyvinylcarbazole to be used as organic photoconductive materials. However, these materials are not satisfactory in film-forming properties, flexibility and adhesiveness and besides, cannot be said to fully meet the above-mentioned fundamental requirements for photoreceptors.

On the other hand, photoreceptors superior in film properties and mechanical strength such as adhesiveness or flexibility can be obtained with organic low molecular photoconductive compounds if binders for making the photoreceptors are selected, but it has been difficult to find compounds suitable to maintain the characteristic of high sensitivity.

Organic photoreceptors of high sensitivity have been developed by carrying carrier generating function and carrier transporting function on different materials to improve the above-mentioned problems. The feature of these photoreceptors called double-layered photoconductive structures is that materials suitable for respective functions can be selected from a wide variety of materials and photoreceptors having optional performances can be easily produced. Thus, various researches have been made thereon.

As mentioned above, various improvements have been made in production of electrophotographic photoreceptors, but those which fully satisfy the above-mentioned fundamental properties and high endurance required for photoreceptors have not yet been obtained.

SUMMARY OF THE INVENTION

An object of the present invention is to provide electrophotographic photoreceptors of high sensitivity and high endurance.

Another object of the present invention is to provide photoreceptors which are high in charging characteristics and undergo substantially no reduction of sensitivity even after repeatedly used and are stable in charge potential.

DESCRIPTION OF THE INVENTION

The inventors have conducted researches on photoconductive materials having high sensitivity and high endurance and as a result, it has been found that the novel bis-azo compounds represented by the following formulas (I)–(II) are effective and the present invention has been accomplished.

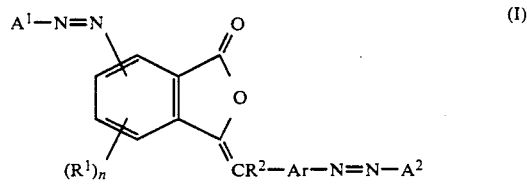

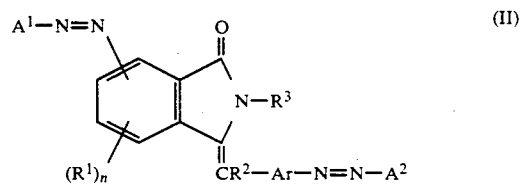

(wherein n represents 0, 1, 2, or 3; $R^1$ represents a halogen atom, a hydroxyl group, or an alkyl, aralkyl, aryl, hyterocyclic or alkoxy group which may have a substituent and when n is 2 or 3, $R^1$ may be identical or different; $R^2$ represents a hydrogen atom, a halogen atom, a cyano group, or an ester, alkyl, aralkyl or aryl group which may have a substituent; $R^3$ represents an alkyl, aralkyl, aryl, or heterocyclic group which may have a substituent; Ar represents an arylene or heteroarylene group which may have a substituent; and $A^1$ and $A^2$ each represents an aryl or heterocyclic group which has a hydroxyl group and may be identical or different).

Examples of $R^1$ are halogen atoms such as fluorine, chlorine and bromine; hydroxyl group; alkyl groups such as methyl, ethyl, and propyl; aralkyl groups such as benzyl, methylbenzyl, chlorobenzyl, β-phenylethyl, and α-naphthylmethyl; aryl groups such as phenyl, methoxyphenyl, methylphenyl, chlorophenyl and napthyl; heterocyclic groups such as thienyl, pyridyl, phenoxathiinyl and carbazolyl; and alkoxy groups such as methoxy and ethoxy.

Examples of $R^2$ are hydrogen atom; halogen atoms such as fluorine, chlorine, and bromine; cyano group; ester groups such as methoxycarbonyl and ethoxycarbonyl; alkyl groups such as methyl, ethyl and propyl; aralkyl groups such as benzyl, methylbenzyl, chlorobenzyl, β-phenylethyl and α-napthylmethyl; and aryl groups such as phenyl, methoxyphenyl, methylphenyl, chlorophenyl and naphthyl.

Examples of $R^3$ are alkyl groups such as methyl and ethyl; aralkyl groups such as methylbenzyl and β-phenylethyl; aryl groups such as chlorophenyl and naphthyl; and heterocyclic groups such as thienyl, pyridyl and carbazolyl.

Examples of Ar are arylene groups such as phenylene, methoxyphenylene, methylphenylene, chlorophenylene and naphthylene and heteroarylene groups such as carbazoldiyl and quinolinediyl.

Examples of $A^1$ and $A^2$ are as shown in the following Table 1 where $A^1$ and $A^2$ are called generically A, namely, A means both $A^1$ and $A^2$.

TABLE 1
Examples of A
| —Ar | A | | | | |
|---|---|---|---|---|---|
| | 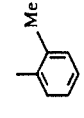 | 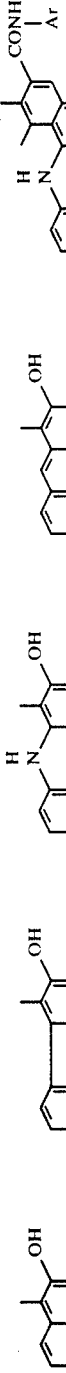 | 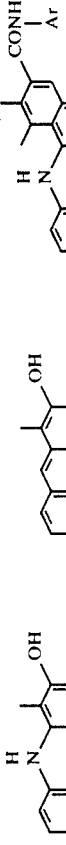 | 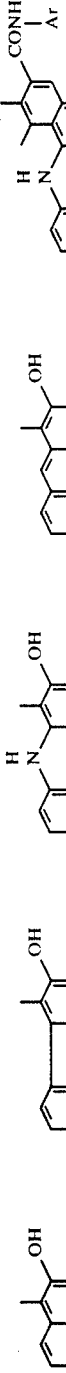 | 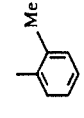 |
| 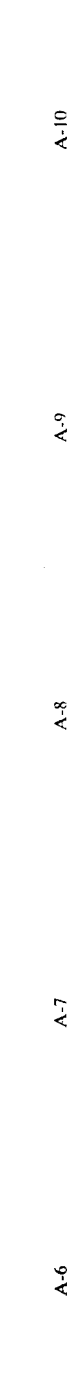 (phenyl) | A-1 | A-2 | A-3 | A-4 | A-5 |
| 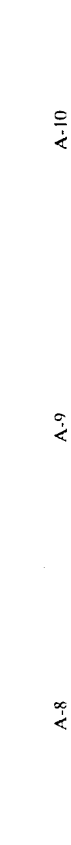 (2-Me) | A-6 | A-7 | A-8 | A-9 | A-10 |
| 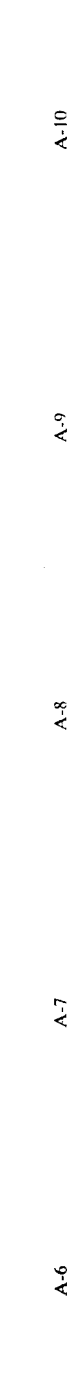 (3-Me) | A-11 | A-12 | A-13 | A-14 | A-15 |
| 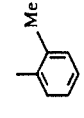 (4-Me) | A-16 | A-17 | A-18 | A-19 | A-20 |
| 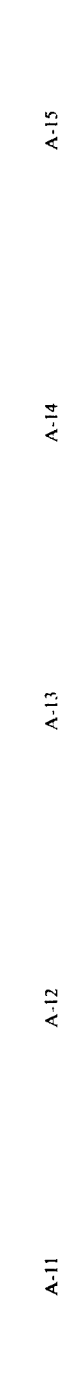 (2-Cl) | A-21 | A-22 | A-23 | A-24 | A-25 |
| 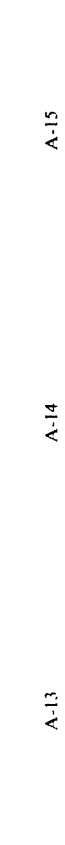 (3-Cl) | A-26 | A-27 | A-28 | A-29 | A-30 |
| 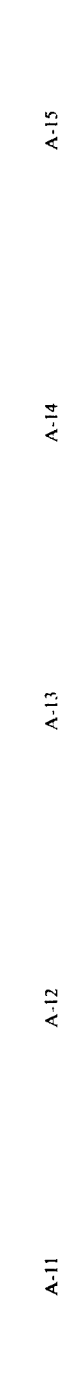 (4-Cl) | A-31 | A-32 | A-33 | A-34 | A-35 |
| 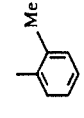 (2-CF$_3$) | A-36 | A-37 | A-38 | A-39 | A-40 |

TABLE 1-continued
Examples of A

| —Ar | | | | A | |
|---|---|---|---|---|---|
| | | | | | |
| CF₃ (3-) | A-41 | A-42 | A-43 | A-44 | A-45 |
| CF₃ (4-) | A-46 | A-47 | A-48 | A-49 | A-50 |
| NO₂ (2-) | A-51 | A-52 | A-53 | A-54 | A-55 |
| NO₂ (3-) | A-56 | A-57 | A-58 | A-59 | A-60 |
| NO₂ (4-) | A-61 | A-62 | A-63 | A-64 | A-65 |
| CN (2-) | A-66 | A-67 | A-68 | A-69 | A-70 |
| CN (3-) | A-71 | A-72 | A-73 | A-74 | A-75 |

TABLE 1-continued
Examples of A

| —Ar | | | | |
|---|---|---|---|---|
| 4-CN-phenyl | 2-Br-phenyl | 3-Br-phenyl | 4-Br-phenyl | 2-OMe-phenyl |
| A-76 | A-77 | A-78 | A-79 | A-80 |
| A-81 | A-82 | A-83 | A-84 | A-85 |
| A-86 | A-87 | A-88 | A-89 | A-90 |
| A-91 | A-92 | A-93 | A-94 | A-95 |
| A-96 | A-97 | A-98 | A-99 | A-100 |

A

| —Ar | OH/CONHAr (phenol-O-phenyl) | OH/CONHAr with NH-phenyl | OH/CONHAr naphthalene | OH/CONHAr with NH-phenyl fused |
|---|---|---|---|---|
| | A-101 | A-102 | A-103 | A-104 | A-105 |
| 3-OMe-phenyl | A-106 | A-107 | A-108 | A-109 | A-110 |
| 4-OMe-phenyl | | | | | |
| 2-Et-phenyl | A-111 | A-112 | A-113 | A-114 | A-115 |

TABLE 1-continued
Examples of A
| A | A-116 | A-117 | A-118 | A-119 | A-120 |
|---|---|---|---|---|---|
| 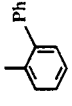 | A-121 | A-122 | A-123 | A-124 | A-125 |
| 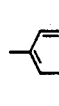 | A-126 | A-127 | A-128 | A-129 | A-130 |
| 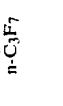 | A-131 | A-132 | A-133 | A-134 | A-135 |
| 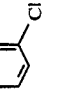 | A-136 | A-137 | A-138 | A-139 | A-140 |
| 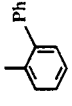 | A-141 | A-142 | A-143 | A-144 | A-145 |
| 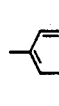 | A-146 | A-147 | A-148 | A-149 | A-150 |
| 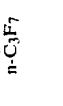 | A-151 | A-152 | A-153 | A-154 | A-155 |
| 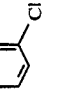 | | | | | |

TABLE 1-continued
Examples of A
| | | | | |
|---|---|---|---|---|
| 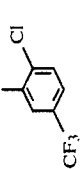 | A-156 | A-157 | A-158 | A-159 | A-160 |
| 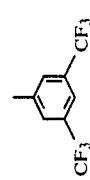 | A-161 | A-162 | A-163 | A-164 | A-165 |
| 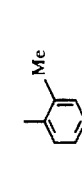 | A-166 | A-167 | A-168 | A-169 | A-170 |
| 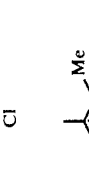 | A-171 | A-172 | A-173 | A-174 | A-175 |
| 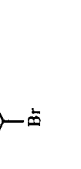 | A-176 | A-177 | A-178 | A-179 | A-180 |
| 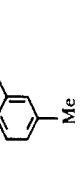 | A-181 | A-182 | A-183 | A-184 | A-185 |
| 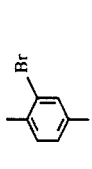 | A-186 | A-187 | A-188 | A-189 | A-190 |
| 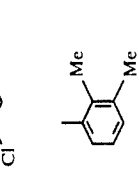 | A-191 | A-192 | A-193 | A-194 | A-195 |

TABLE 1-continued
Examples of A
| | | | | | |
|---|---|---|---|---|---|
| 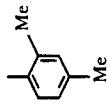 | A-196 | A-197 | A-198 | A-199 | A-200 |
| 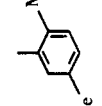 | A-201 | A-202 | A-203 | A-204 | A-205 |
| 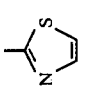 | A-206 | A-207 | A-208 | A-209 | A-210 |
| 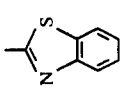 | A-211 | A-212 | A-213 | A-214 | A-215 |
| 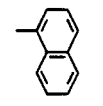 | A-216 | A-217 | A-218 | A-219 | A-220 |
| 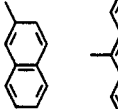 | A-221 | A-222 | A-223 | A-224 | A-225 |
| 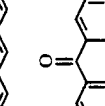 | A-226 | A-227 | A-228 | A-229 | A-230 |
| 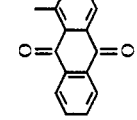 | A-231 | A-232 | A-233 | A-234 | A-235 |
|  | A-236 | A-237 | A-238 | A-239 | A-240 |

TABLE 1-continued
Examples of A
| | | | | A | | |
|---|---|---|---|---|---|---|
| 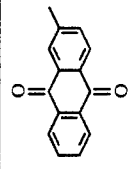 | 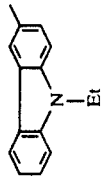 | | |  | 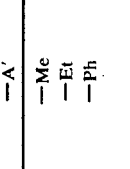 | 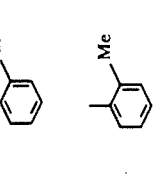 |
| A-241 | A-242 | A-243 | A-244 | A-245 | | |
| A-246 | A-247 | A-248 | A-249 | A-250 | | |
| —A' | A | | | |
|---|---|---|---|---|
| | 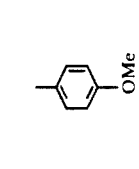 | 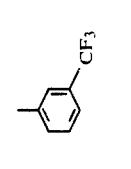 |  |  |
| —Me | A-251 | A-252 | A-253 | A-254 | A-255 |
| —Et | A-256 | A-257 | A-258 | A-259 | A-260 |
| —Ph | A-261 | A-262 | A-263 | A-264 | A-265 |
| 2-Cl-C6H4 | A-266 | A-267 | A-268 | A-269 | A-270 |
| 2-Me-C6H4 | A-271 | A-272 | A-273 | A-274 | A-275 |
| 4-OMe-C6H4 | A-276 | A-277 | A-278 | A-279 | A-280 |
| 3-CF3-C6H4 | A-281 | A-282 | A-283 | A-284 | A-285 |

TABLE 1-continued
Examples of A

| A | A-286 | A-287 | A-288 | A-289 | A-290 |
|---|---|---|---|---|---|
| 3-NO₂-C₆H₄- | A-286 | A-287 | A-288 | A-289 | A-290 |
| 4-CN-C₆H₄- | A-291 | A-292 | A-293 | A-294 | A-295 |
| 3,5-(CF₃)₂-C₆H₃- | A-296 | A-297 | A-298 | A-299 | A-300 |

-continued
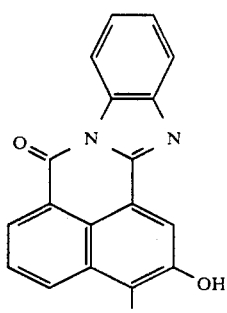
A-301
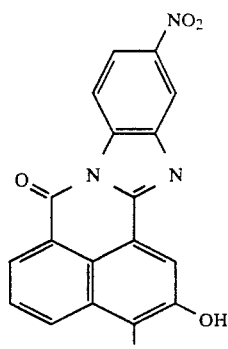
A-305
A-302
A-306
A-303
A-307
A-304
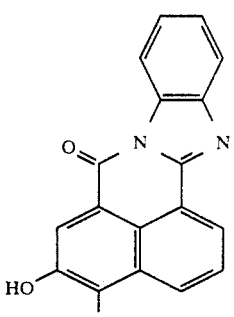
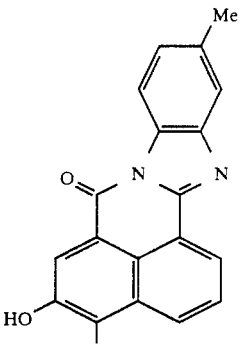
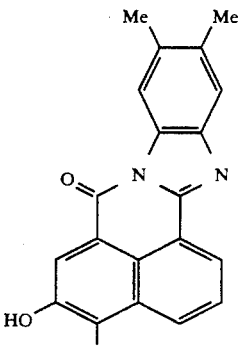
A-308

-continued
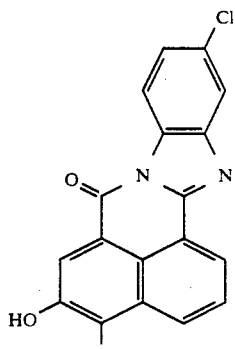  A-309
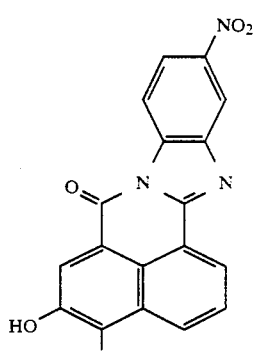  A-310
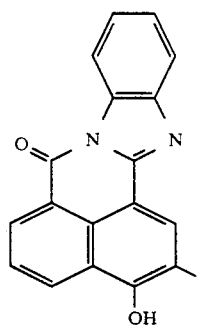  A-311
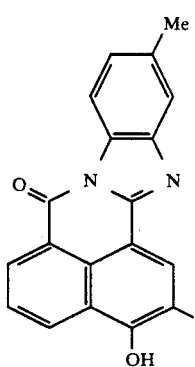  A-312
-continued
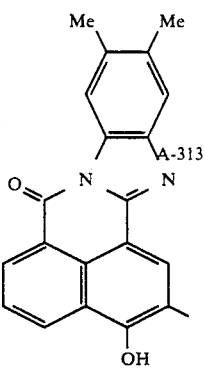  A-313
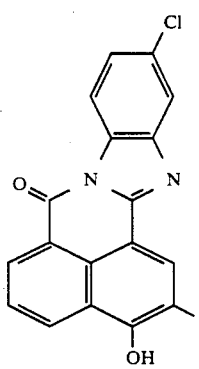  A-314
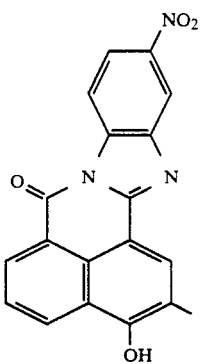  A-315
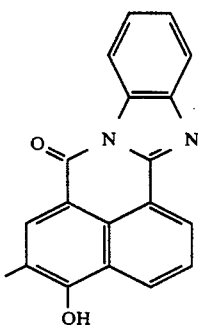  A-316

-continued
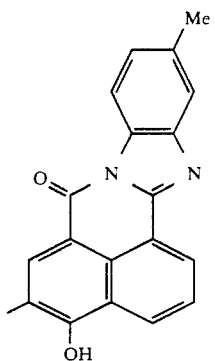 A-317
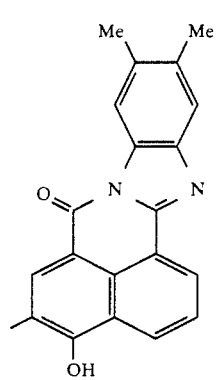 A-318
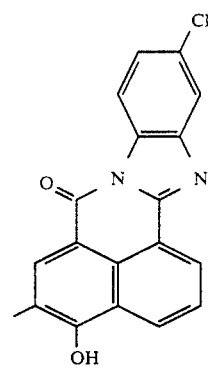 A-319
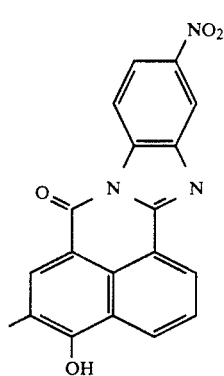 A-320
-continued
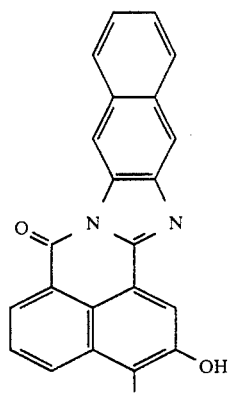 A-321
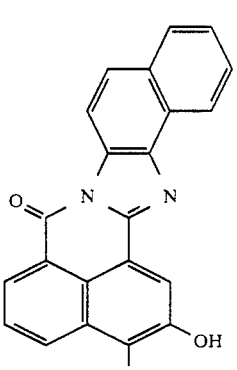 A-322
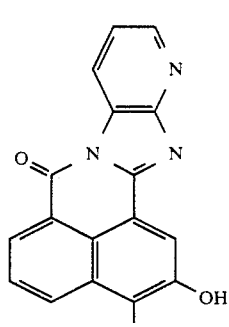 A-323
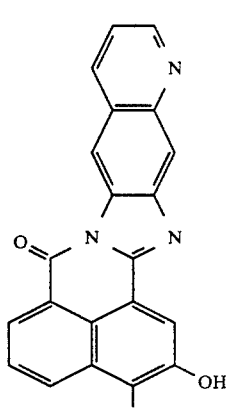 A-324

A-325
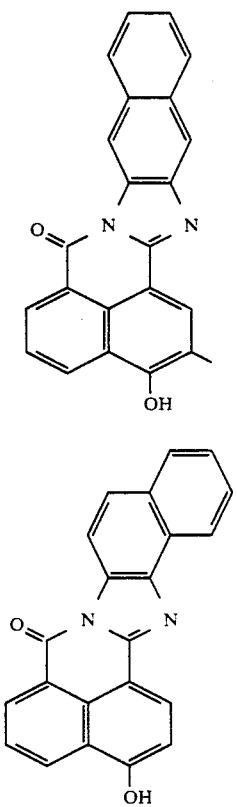
A-326
A-327
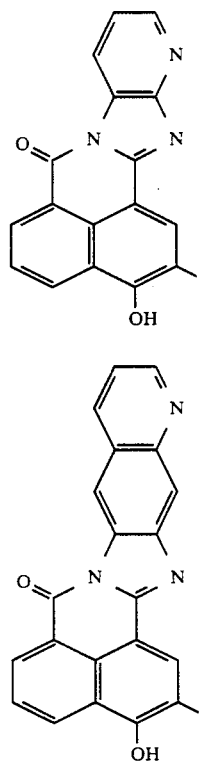
A-328
Examples of the bis-azo compounds represented by the formulas (I) and (II) are shown below. In the following formulas, $A^1$ and $A^2$ represent the groups shown in Table 1.
Compounds represented by the formula (I):
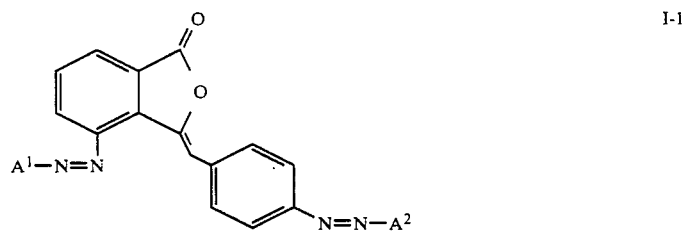
I-1
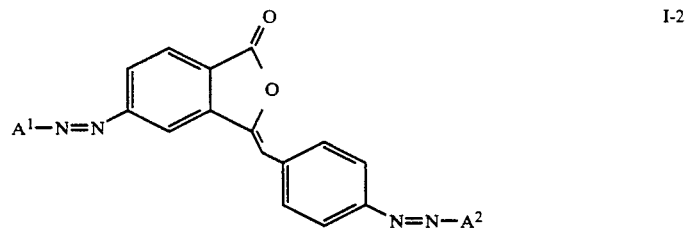
I-2
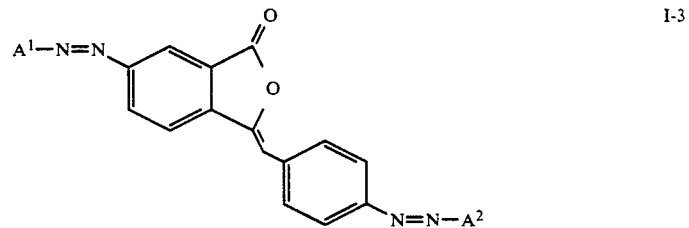
I-3

-continued
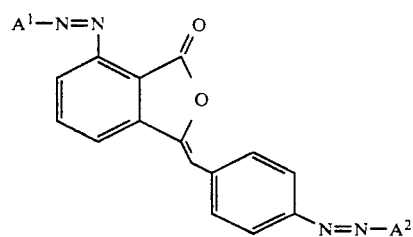
I-4
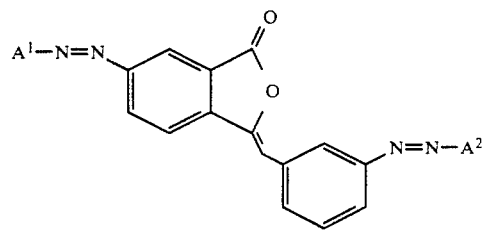
I-5
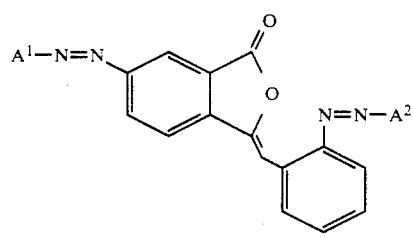
I-6
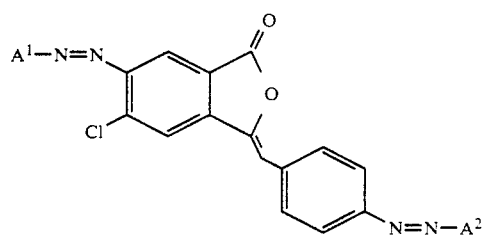
I-7
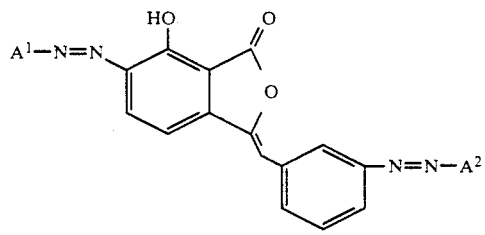
I-8
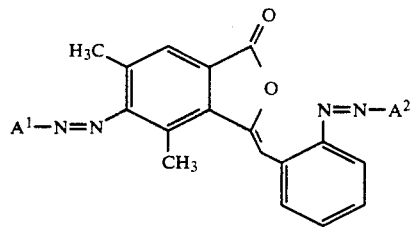
I-9
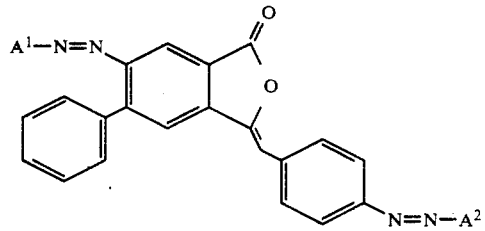
I-10

-continued
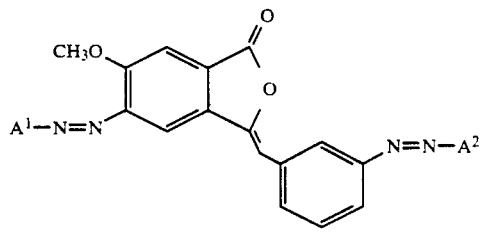
I-11
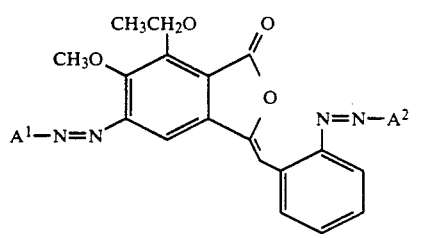
I-12
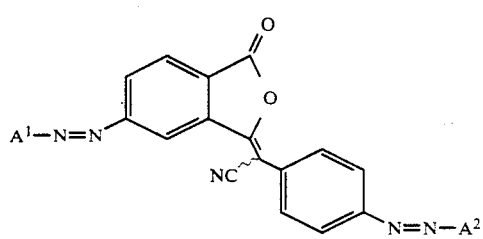
I-13
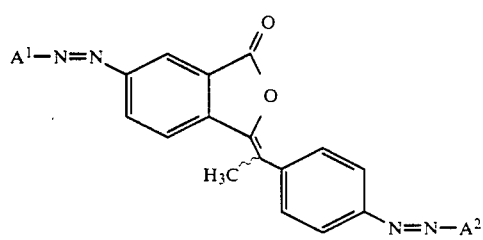
I-14
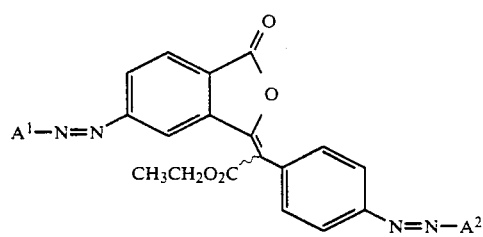
I-15
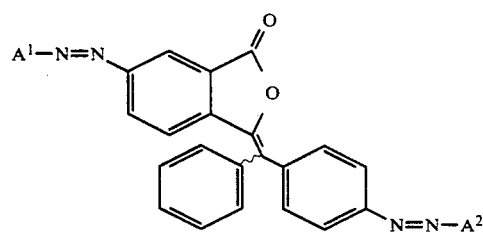
I-16
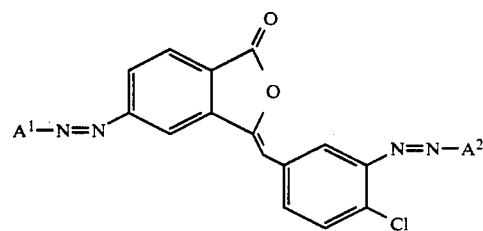
I-17

-continued
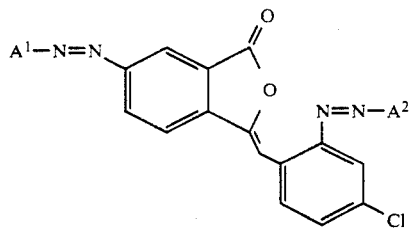
I-18
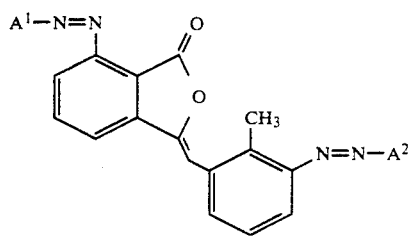
I-19
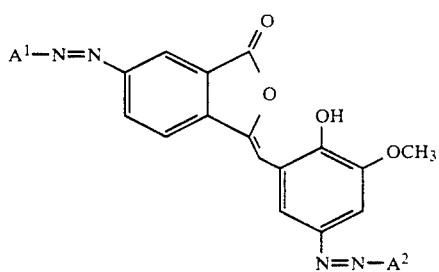
I-20
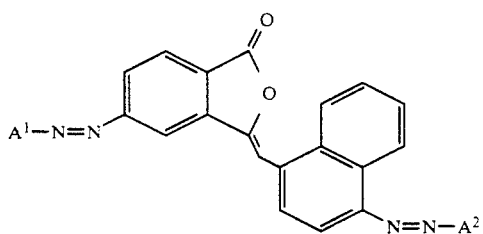
I-21
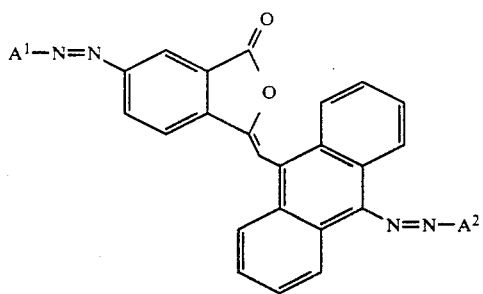
I-22
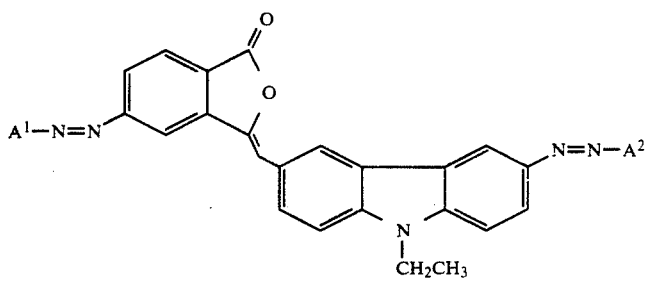
I-23

-continued
I-24
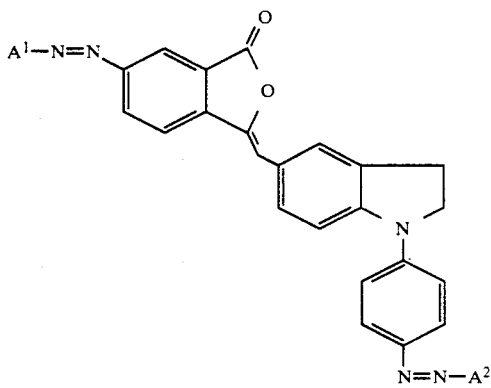
I-25
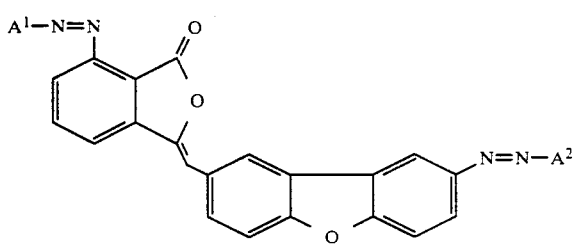
I-26
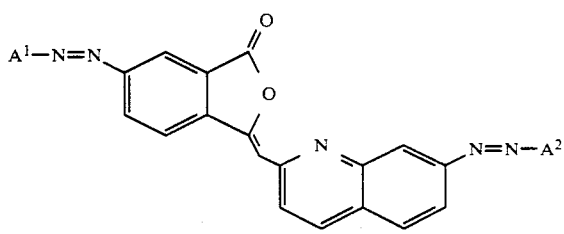
I-27
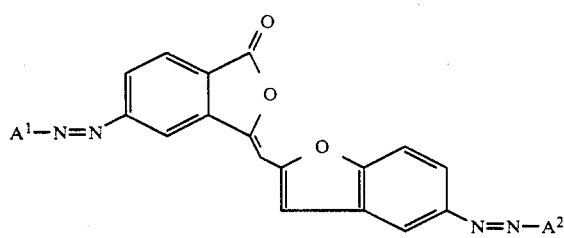
I-28
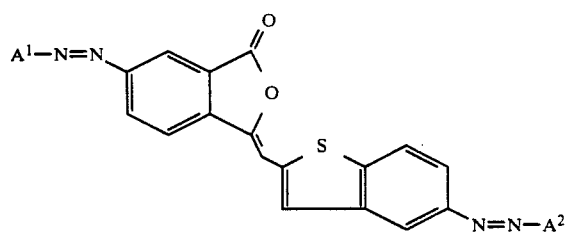
I-29
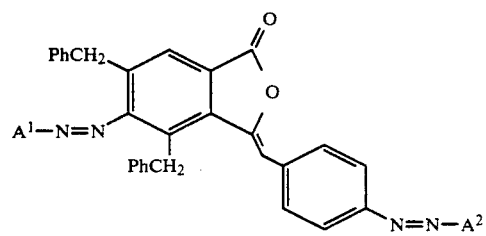

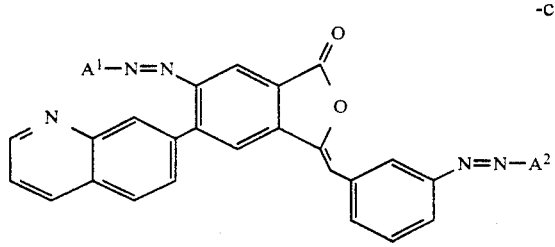
I-30
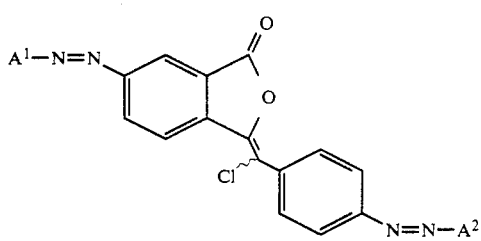
I-32
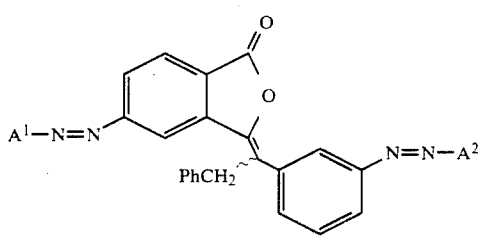
Compounds represented by the formula (II);
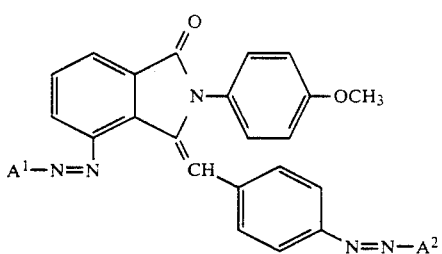
II-1
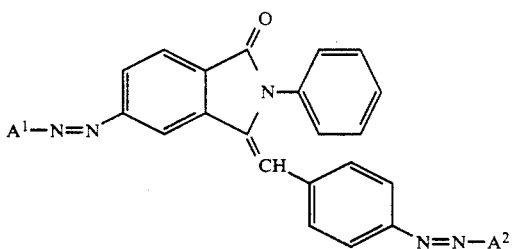
II-2
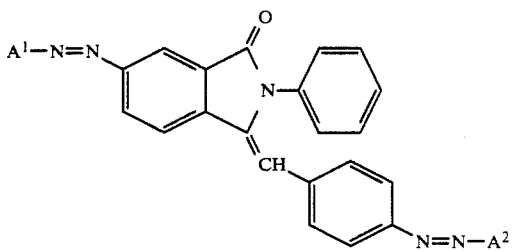
II-3

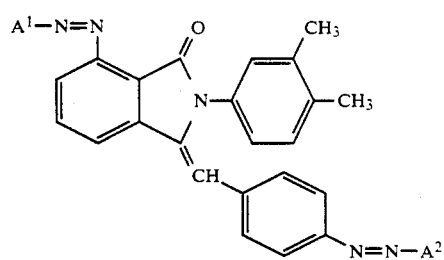
II-4
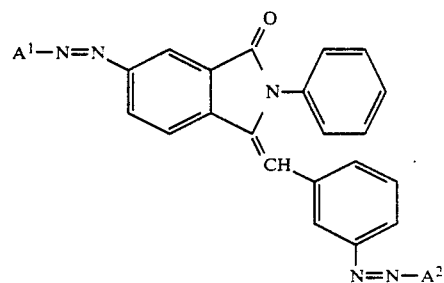
II-5
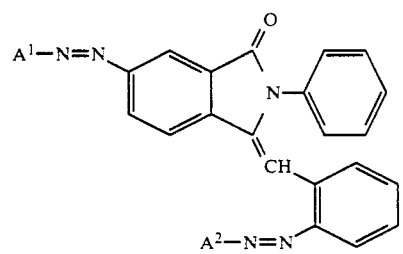
II-6
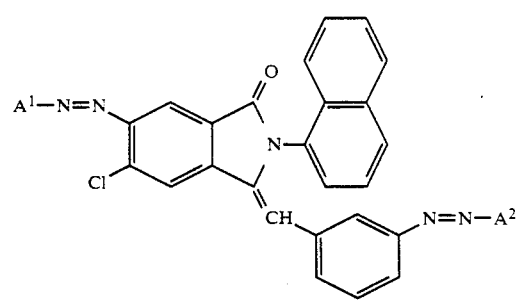
II-7
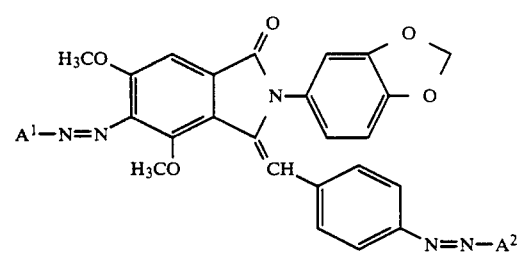
II-8
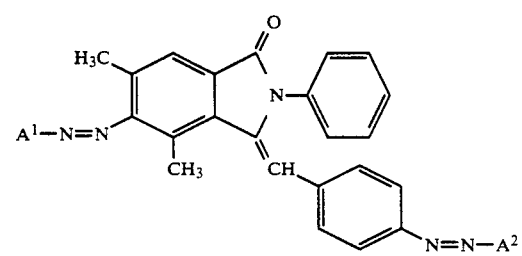
II-9

-continued
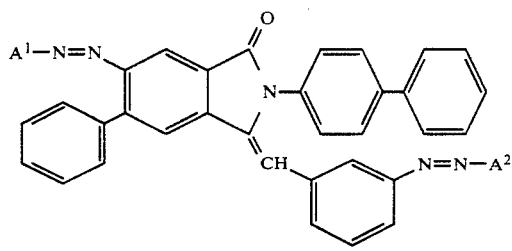
II-10
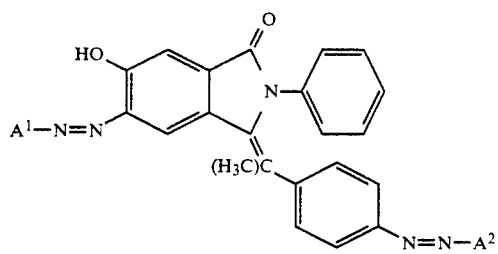
II-11
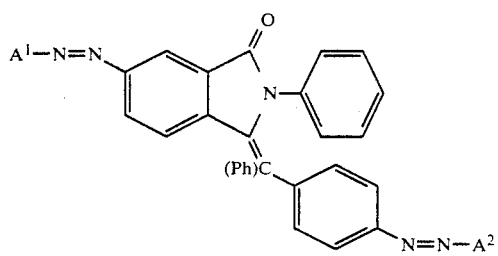
II-12
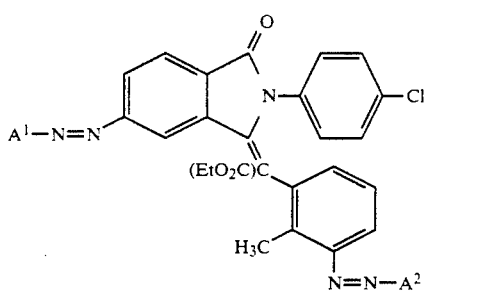
II-13
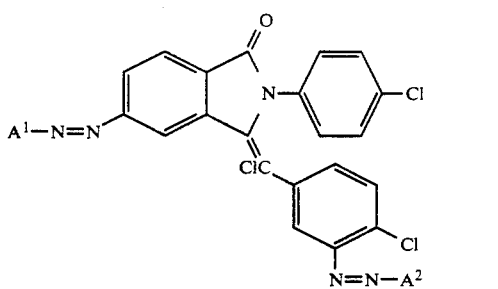
II-14
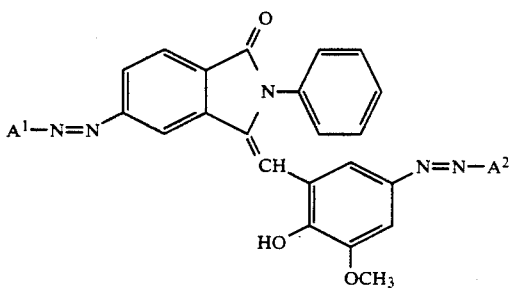
II-15

-continued
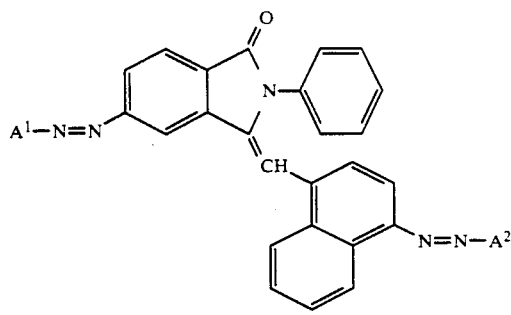
II-16
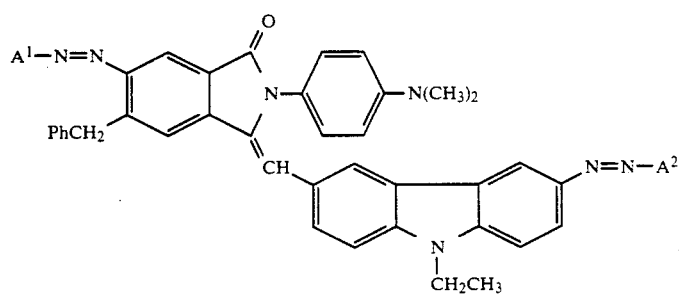
II-17
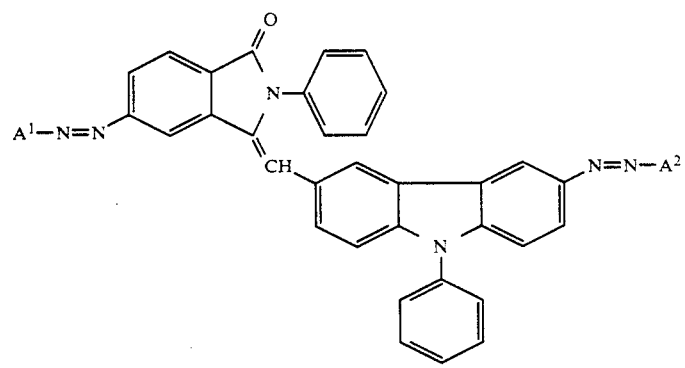
II-18
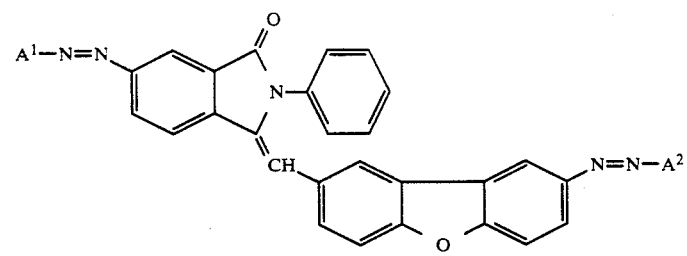
II-19
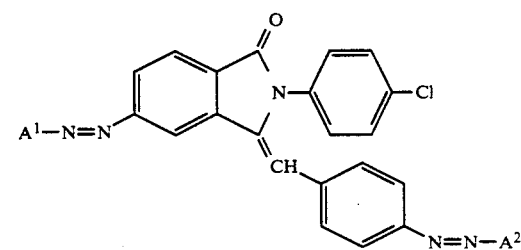
II-20

-continued
II-21
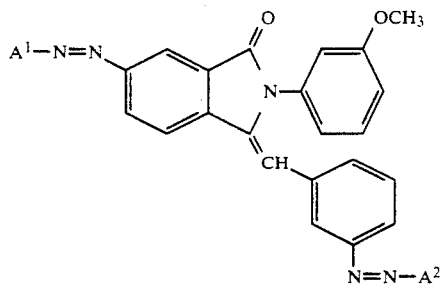
II-22
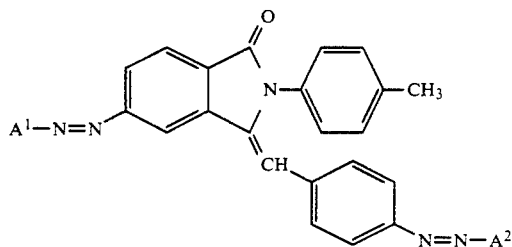
II-23
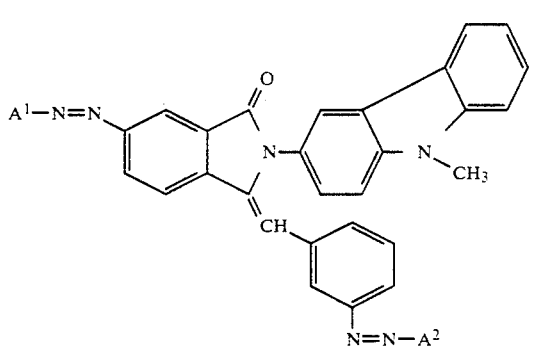
II-24
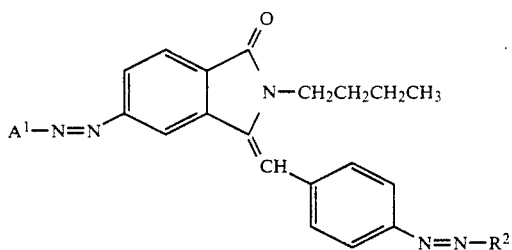
II-25
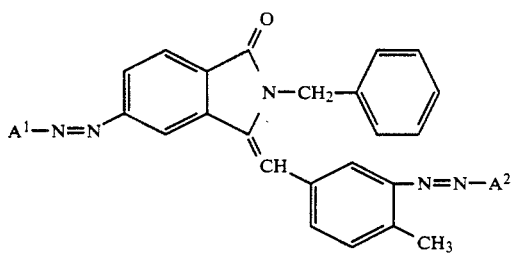
II-26
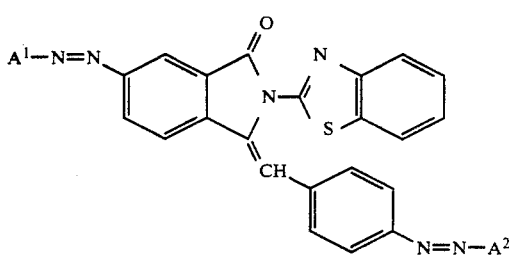

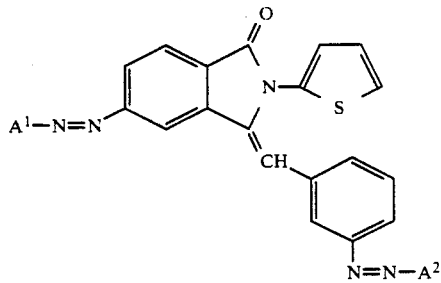

II-27

The bis-azo compounds represented by the formula (I) of the present invention can be obtained, for example, by diazotizing a diamine represented by the following formula (III) by conventional method and reacting the resulting diazonium salt with the corresponding coupler.

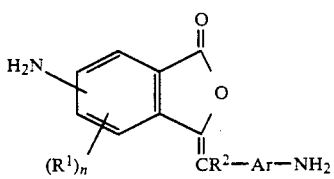

[wherein $R^1$, $R^2$, Ar and n have the same meanings as defined in the formulas (I) and (II)]

Furthermore, the bis-azo compounds represented by the formula (II) of the present invention can be obtained, for example, by diazotizing a diamine represented by the following formula (IV) and reacting the resulting diazonium salt with the corresponding coupler.

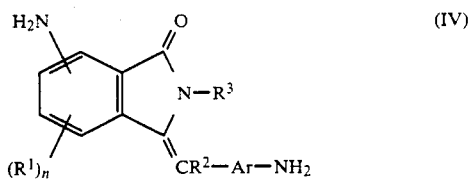

[wherein $R^1$, $R^2$, $R^3$, Ar and n have the same meanings as defined in the formula (II)]

Typical synthesis examples of the bis-azo compounds are shown below.

SYNTHESIS EXAMPLE 1

(Compound I-3, $A^1 = A^2 = A-21$)

6-Nitro-3-(p-nitrophenylmethylene)phthalide prepared by the process mentioned in "Nihon Kagaku Kaishi (Journal of Japan Chemical Society)", page 110 (1973) was reduced with iron powder by conventional method and the resulting crude product was crystallized from isopropanol to obtain 6-amino-3-(p-aminophenylmethylene)phthalide.

Yield: 80%.
Melting point: 256.7° C. (dec.).
$^1$HNMR (DMSO)
5.45 (s, 2H)
5.85 (s, 2H)
6.30 (s, 1H)
6 59 (d, J=8.56 Hz, 2H)
6.89 (s, 1H)
7.00 (d, J=8.44 Hz, 1H)
7.43 (d, J=8.56 Hz, 2H)
7.63 (d, J=8.44 Hz, 1H)

The above diamino compound (0.25 g) was dissolved in DMF (5 ml) and 2N hydrochloric acid (5 ml) and thereto was added an aqueous solution (1 ml) of sodium nitrite (0.15 g) at about 5° C. After 30 minutes, 42% fluoroboric acid (4 ml) was added thereto and the precipitated tetrazonium salt was collected by filtration. This tetrazonium salt and N-(2-chlorophenyl)-3-hydroxy-2-naphthamide (a compound corresponding to A-21) (0.60 g) were dissolved in DMF (50 ml) and thereto was added dropwise an aqueous solution (3 ml) of sodium acetate (0.66 g) over a period of 5 minutes at 5°–10° C. The solution was stirred at the same temperature for 2 hours and furthermore, at room temperature for 2 hours and the precipitate was collected by filtration and was washed with 100 ml each of DMF, acetone and water.

Amount of product: 0.34 g.
Yield: 39%.
Melting point: 270° C. or higher.

SYNTHESIS EXAMPLE 2

(Compound II-3, $A^1 = A^2 = A-21$)

5.3 g of 6-nitro-3-(p-nitrophenylmethylene)phthalide prepared by the process mentioned in "Nihon Kagaku Kaishi (Journal of Japan Chemical Society)", page 110 (1973) and 3.8 g of aniline were refluxed under heating in 40 ml of acetic acid for 18 hours. The resulting product was recrystallized from methyl ethyl ketone to obtain 2.2 g of a condensate. This was reduced with iron powder by conventional method to obtain 1.7 g of a diamine represented by the following formula (V).

Yield: 94%.

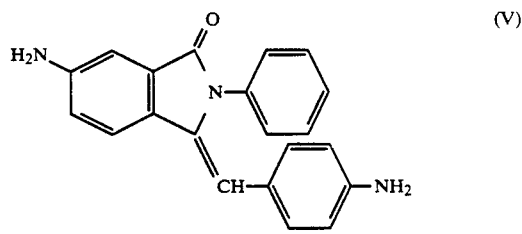

Melting point: 192.8° C. (dec.).
$^1$HNMR (DMSO, ppm)
5.06 (s, 2H)
5.64 (s, 2H)
6.11 (d, J=8.34 Hz, 2H)
6.53 (d, J=8.34 Hz, 2H)
6.58 (s, 1H)
6.91 (s, 1H)

6.94 (d, J=8.14 Hz, 1H)
7.1-7.3 (m, 5H)
7.71 (d, J=8.14 Hz, 1H)

The above diamino compound (0.33 g) was dissolved in DMF (5 ml) and 2N hydrochloric acid (5 ml) and thereto was added an aqueous solution (1 ml) of sodium nitrite (0.15 g) at about 5° C. After 30 minutes, 42% fluoroboric acid (4 ml) was added thereto and the precipitated tetrazonium salt was collected by filtration. This tetrazonium salt and a compound corresponding to A-21 (0.60 g) were dissolved in DMF (50 ml) and thereto was added dropwise an aqueous solution (3 ml) of sodium acetate (0.66 g) over a period of 5 minutes at 5°-10° C. The solution was stirred at the same temperature for 2 hours and furthermore, at room temperature for 2 hours and the precipitate was collected by filtration and was washed with 100 ml each of DMF, acetone and water.

Amount of product: 0.73 g.
Yield: 77%.
Melting point: 270° C. or higher.

The electrophotographic photoreceptor of the present invention is obtained by containing one or more bis-azo compounds represented by the formulas (I) and (II). Photoreceptor of various types are known and the photoreceptors of the present invention may be any of these known photoreceptors. For example, one of them comprises a conductive support and, provided thereon, a light-sensitive layer comprising the bis-azo compound, a known charge transport material and a film-forming binder resin. Furthermore, there has been known a double-layered photoreceptor which comprises a conductive support and, provided thereon, a charge generation layer comprising the bis-azo compound and a binder resin and a charge transport layer comprising a charge transport material and a binder resin. Either of the charge generation layer or the charge transport layer can be the upper layer.

Charge transport materials include the hole transport material and the electron transport material. Examples of the former are oxadiazoles disclosed in Japanese Patent Kokoku No. 34-5466, triphenylmethanes disclosed in Japanese Patent Kokoku No. 45-555, pyrazolines disclosed in Japanese Patent Kokoku No. 52-4188, hydrazones disclosed in Japanese Patent Kokoku No. 55-42380, oxazoles disclosed in Japanese Patent Kokai No. 56-123544, triarylamines disclosed in Japanese Patent Kokoku No. 58-32372, and stilbenes disclosed in Japanese Patent Kokai No. 58-198043. Examples of the electron transport materials are chloranil, tetracyanoethylene, 2,4,7-trinitro-9-fluorenone, 2,4,5,7-tetranitroxanthone, and 1,3,7-trinitrodibenzothiophene. These charge transport materials may be used singly or in combination of two or more.

As the supports used for producing the photoreceptors using the compounds of the present invention, there may be used any of metallic drums, metallic sheets, papers subjected to conduction treatment, sheet-like, drum-like and belt-like plastic films and the like.

As the film-forming binder resins used for forming a light-sensitive layer on these supports, mention may be made of various resins depending on the field of use. For example, those which are used for photoreceptors for copying include polystyrene resins, polyvinyl acetal resins, polysulfone resins, polycarbonate resins, polyester resins, polyphenylene oxide resins, polyallylate resins, acrylic resins, methacrylic resins and phenoxy resins. Among them, polystyrene resins, polyvinyl acetal resins, polycarbonate resins, polyester resins, and polyallylate resins are superior in potential characteristics as photoreceptors. These resins may be used singly or in combination of two or more.

Amount of these resins contained in the light-sensitive layer is preferably 10-500% by weight, more preferably 50-150% by weight based on the bis-azo compound. If proportion of the resins is too high, charge generation efficiency decreases and if it is too low, problems occur in film-forming properties.

Some of these resins are low in mechanical strengths such as tensile strength, flexural strength and compressive strength. For improving these properties, materials which impart plasticity can be added. Examples of these materials are phthalic acid esters such as DOP and DBP, phosphoric acid esters such as TCP and TOP, sebacic acid esters, adipic acid esters, nitrile rubber, and chlorinated hydrocarbons. If these materials are added in an amount more than required, electrophotographic characteristics are adversely affected and so preferably they are added in an amount of 20% or less based on the weight of the binder resins.

Furthermore, antioxidant, anti-curing agent and so on can be added as required as additives to the photoreceptors.

The following nonlimiting examples further illustrate the present invention.

EXAMPLE 1

One part by weight of Compound I-3 ($A^1=A^2=$A-21) and 1 part by weight of a polyester resin (BYRON 200 manufactured by Toyobo Co., Ltd.) were added to 100 parts by weight of tetrahydrofuran and the mixture was dispersed together with glass beads for 2 hours by a paint conditioner. The resulting dispersion was coated on an aluminum-vapor deposited polyester by an applicator to form a charge generation layer of about $0.2\mu$ in film thickness. Then, p-dibenzylaminobenzaldehyde-diphenylhydrazone was mixed with a polyallylate resin (U-Polymer manufactured by Unitika Ltd.) at a weight ratio of 1:1 and a 10% solution of the mixture in dichloroethane as a solvent was prepared. This solution was coated on the charge generation layer formed above by an applicator to form a charge transport layer of about $20\mu$ in thickness.

The resulting double-layered photoreceptor was evaluated on electrophotographic characteristics by an electrostatic recording tester (SP-428 manufactured by Kawaguchi Electric Mfg. Co., Ltd.) under the following conditions.

Applied voltage: $-6$ kv, Static No. 3.

As a result, half decay exposure was 1.4 lux·second, which shows a very high sensitivity.

Furthermore, the photoreceptor was subjected to evaluation of characteristics for repeated use, one cycle of which comprised charging - discharging (discharging light: exposure to white light of 400 lux $\times$ 1 second). Change in the charge potential after repeated use of 1000 times was measured to obtain the initial potential of $-950$ V in the first measurement and that of $-940$ V in the 1000th measurement. Thus, it was seen that reduction of potential due to the repetition of the cycle was a little and the potential was stable.

EXAMPLES 2-5

Double-layered photoreceptors were produced in the same manner as in Example 1 except that the bis-azo compounds as shown in Table 2 were used in place of the bis-azo compound used in Example 1. Under the same conditions as in Example 1, half decay exposure $E_{\frac{1}{2}}$ (lux·sec) and the initial potential $V_0(V)$ were measured at the first time and after repetition of 1000 times. The results are shown in Table 2.

TABLE 2

| Example | Compound ( )*1 | The first measurement | | The 1000th measurement | |
|---|---|---|---|---|---|
| | | $V_0(V)$ | $E_{\frac{1}{2}}$*2 | $V_0(V)$ | $E_{\frac{1}{2}}$*2 |
| 2 | I-2 (A-6) | −970 | 1.6 | −960 | 1.6 |
| 3 | I-5 (A-115) | −920 | 1.1 | −910 | 1.1 |
| 4 | I-7 (A-30) | −850 | 1.9 | −840 | 1.9 |
| 5 | I-13 (A-161) | −940 | 1.2 | −900 | 1.2 |

*1 The content in ( ) indicates $A^1$, $A^2$.
*2 (lux·sec)

COMPARATIVE EXAMPLES 1 AND 2

Photoreceptors were produced and evaluated in the same manner as in Example 1 except that the following Comparative Compounds 1 and 2 were used in place of the compound used in Example 1. The results are shown in Table 3.

Comparative Compound 1

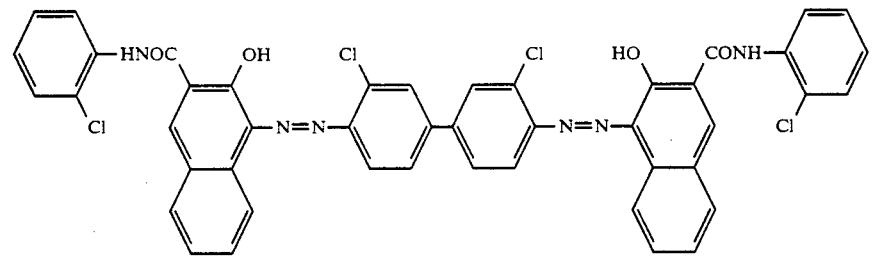

Comparative Compound 2

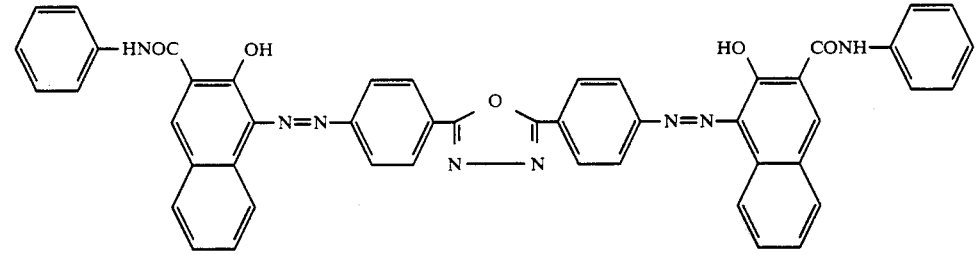

TABLE 3

| Comparative Example | Comparative Compound | The first measurement | | The 1000th measurement | |
|---|---|---|---|---|---|
| | | $V_0(V)$ | $E_{\frac{1}{2}}$* | $V_0(V)$ | $E_{\frac{1}{2}}$* |
| 1 | 1 | −870 | 3.2 | −510 | 2.2 |
| 2 | 2 | −800 | 4.5 | −430 | 3.0 |

*2 (lux·sec)

EXAMPLES 6–9

Charge generation layer was formed in the same manner as in Example 1 except that bis-azo compounds as shown in Table 4 were used in place of the compound used in Example 1.

Then, p-benzylethylaminobenzaldehydediphenylhydrazone and a polyester resin (BYRON 200) were mixed at a weight ratio of 1:1 and a 10% solution of the mixture in dichloroethane as a solvent was prepared. This solution was coated on the above charge generation layer by an applicator to form a charge transport layer of about 20μ in thickness.

Electrophotographic characteristics of the thus obtained double-layered photoreceptors were evaluated in the same manner as in Example 1. The results are shown in Table 4.

TABLE 4

| Example | Compound ( )*1 | The first measurement | | The 1000th measurement | |
|---|---|---|---|---|---|
| | | $V_0(V)$ | $E_{\frac{1}{2}}$*2 | $V_0(V)$ | $E_{\frac{1}{2}}$*2 |
| 6 | I-3 (A-6, 21) | −950 | 1.4 | −930 | 1.4 |
| 7 | I-14 (A-81, 115) | −920 | 1.2 | −900 | 1.2 |
| 8 | I-21 (A-19) | −830 | 1.8 | −770 | 1.7 |
| 9 | I-23 (A-56) | −840 | 1.8 | −790 | 1.8 |

*1 The content in ( ) indicates $A^1$, $A^2$.
*2 (lux·sec)

EXAMPLE 10

Example 1 was repeated except that Compound II-3 ($A^1 = A^2$-A = 21) was used in place of Compound I-3.

As a result, the half decay exposure was 1.3 lux·second, indicative of high sensitivity.

Furthermore, the initial potential at the first time was −920 V and the initial potential after repetition of 1000 times was −900 V. It was also found that reduction of potential due to repeated use was a little and the potential was stable.

EXAMPLES 11–14

Double-layered photoreceptors were produced in the same manner as in Example 1 except that the bis-azo compound as shown in Table 5 were used in place of the bis-azo compound used in Example 1. Under the same conditions as in Example 1, half decay exposure $E_{\frac{1}{2}}$ (lux·sec) and the initial potential $V_0$ (V) were measured at the first time and after repetition of 1000 times. The results are shown in Table 5.

TABLE 5

| Example | Compound ( )*1 | The first measurement | | The 1000th measurement | |
|---|---|---|---|---|---|
| | | Vo(V) | E½*2 | Vo(V) | E½*2 |
| 11 | II-5 (A-6) | −910 | 1.3 | −900 | 1.3 |
| 12 | II-7 (A-86) | −890 | 1.5 | −870 | 1.5 |
| 13 | II-16 (A-131) | −880 | 1.4 | −860 | 1.4 |
| 14 | II-23 (A-115) | −850 | 1.0 | −830 | 1.0 |

*1 The content in ( ) indicates A¹, A².
*2 (lux·sec)

EXAMPLES 15-18

Charge generation layer was formed in the same manner as in Example 1 except that bis-azo compounds as shown in Table 7 were used in place of the compound used in Example 1.

Then, p-benzylethylaminobenzaldehydediphenylhydrazone and a polyester resin (BYRON 200) were mixed at a weight ratio of 1:1 and a 10% solution of the mixture in dichloroethane as a solvent was prepared. This solution was coated on the above charge generation layer by an applicator to form a charge transport layer of about 20μ in thickness.

Electrophotographic characteristics of the thus obtained double-layered photoreceptors were measured in the same manner as in Example 1. The results are shown in Table 7.

TABLE 7

| Example | Compound ( )*1 | The first measurement | | The 1000th measurement | |
|---|---|---|---|---|---|
| | | Vo(V) | E½*2 | Vo(V) | E½*2 |
| 15 | II-3 (A-26, 161) | −940 | 1.2 | −910 | 1.2 |
| 16 | II-3 (A-6, 10) | −850 | 1.1 | −840 | 1.1 |
| 17 | II-24 (A-45) | −900 | 1.0 | −850 | 1.0 |
| 18 | II-25 (A-84) | −810 | 2.0 | −770 | 2.0 |

*1 The content in ( ) indicates A¹, A².
*2 (lux·sec)

As is clear from the above, according to the present invention, electrophotographic photoreceptors of high sensitivity and high endurance can be obtained.

What is claimed is:

1. An electrophotographic photoreceptor which comprises a conductive support and a light-sensitive layer which contains at least one bis-azo compound selected from the group consisting of those represented by the following formulas (I)-(II):

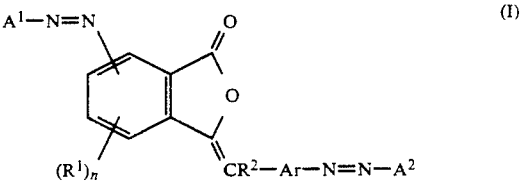

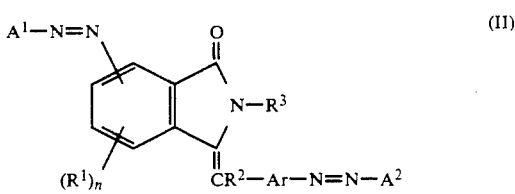

wherein n represents 0, 1, 2, or 3; $R^1$ represents a halogen atom, a hydroxyl group, or an alkyl, aralkyl, aryl, heterocyclic or alkoxy group which may have a substituent and when n is 2 or 3, $R^1$ may be identical or different; $R^2$ represents a hydrogen atom, a halogen atom, a cyano group, or an ester, alkyl, aralkyl or aryl group which may have a substituent; $R^3$ represents an alkyl, aralkyl, aryl or heterocyclic group which may have a substituent; Ar represents an arylene or heteroarylene group which may have a substituent; and $A^1$ and $A^2$ each represents an aryl or heterocyclic group which has a hydroxyl group and may be identical or different.

2. An electrophotographic photoreceptor according to claim 1, wherein the light-sensitive layer additionally contains a charge transport material and a binder resin.

3. An electrophotographic photoreceptor according to claim 1, wherein the light-sensitive layer comprises a charge generation layer comprising the bis-azo compound and a binder resin and a charge transport layer comprising a charge transport material and a binder resin.

4. An electrophotographic photoreceptor according to claim 1, wherein the conductive support is selected from a metallic drum, a metallic sheet, a conductive paper, and a sheet-like, drum-like or belt-like plastic film.

* * * * *